Oct. 7, 1969 RINSKE WAKABAYASHI 3,471,104

DEVICE FOR DRIVING RECORDING MEDIUM

Filed Oct. 4, 1966 2 Sheets-Sheet 1

United States Patent Office 3,471,104
Patented Oct. 7, 1969

3,471,104
DEVICE FOR DRIVING RECORDING MEDIUM

Rinske Wakabayashi, Tokyo, Japan, assignor to Aiwa Co., Ltd., Tokyo, Japan, a corporation of Japan Filed Oct. 4, 1966, Ser. No. 584,130
Claims priority, application Japan, Oct. 5, 1965, 40/81,089
Int. Cl. G11b *15/44*
U.S. Cl. 242—201 5 Claims

ABSTRACT OF THE DISCLOSURE

A device for fast forwarding and rewinding of a recording medium comprising a pair of turntables rotatably mounted on a planar base, a pair of idlers mounted on the planar base so that each is in peripheral contact with one of the turntables, an electric motor tiltably mounted on the planar base so that its rotary shafts engage the idlers when the motor is tilted, and a push button mechanism for selectively tilting the electric motor whereby large reels may be rapidly driven with accuracy.

This invention relates to improvements in the structure of recording medium drive devices employing the so-called butterfly system usually used in rim driven magnetic recorders or the like.

The primary object of the present invention is to provide a novel and improved device for use in a magnetic recorder or the like for fast forwarding and rewinding of a recording medium such as a magnetic tape or a film in which means are provided to transmit the driving power of the rotary shaft of an electric motor to support members for a supply and a take-up reel through idlers so that a recording medium carried by a reel of relatively large diameter, for example, a 7-inch reel, can be positively and easily supplied or taken up without any need for enlarging the overall size and shape of the recorder or the like.

According to the present invention, there is provided a device for fast forwarding and rewinding of a recording medium comprising a planar base, a pair of spaced turntables pivotally mounted on said base for carrying thereon a recording medium such as a magnetic tape, idlers, one for each turntable, disposed inwardly of said turntables and urged into peripheral contact therewith for causing rotation of said turntables, an electric motor tiltably mounted in said base and having its rotary shaft sections extending in opposite directions toward said idlers so that one of the rotary shaft sections when tilted in one direction can be urged into pressure contact with one face of the associated idler, and means for causing the tilting movement of said electric motor for thereby bringing one of said rotary shaft sections into driving engagement with the associated idler for causing the rotation of the associated turntable.

The above and other objects, advantages and features of the present invention will be apparent from the following description with reference to the accompanying drawings, in which.

Figure 1:
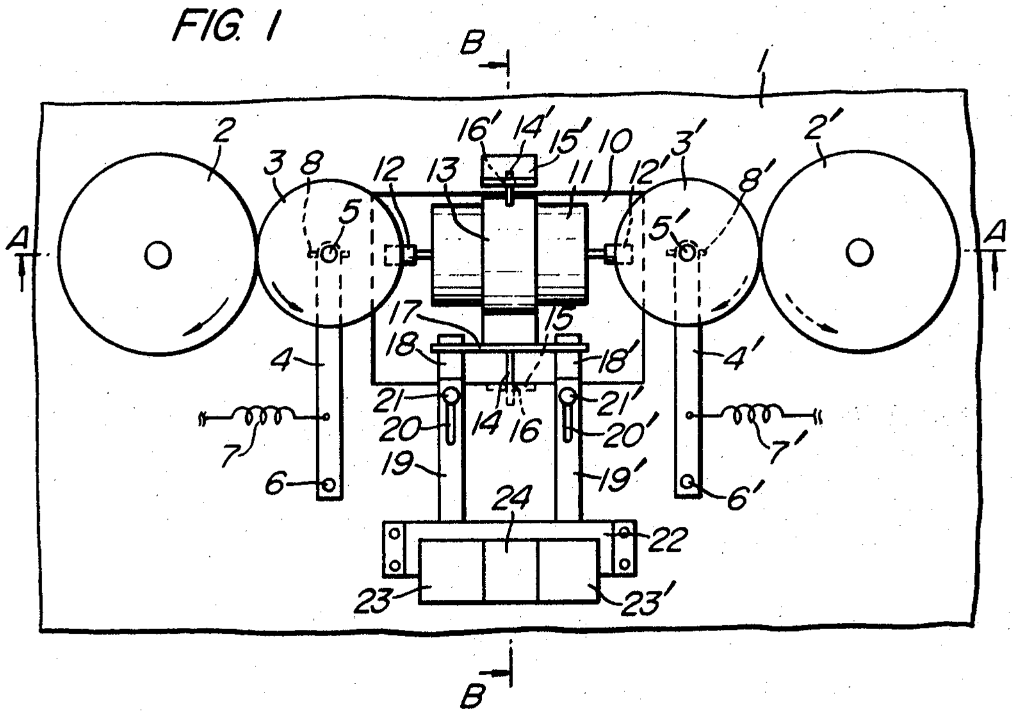
FIG. 1 is a plan view of parts of an apparatus equipped with the device according to the present invention.

Referring now to the drawings, the recording medium drive device of the invention includes a planar base 1 of metal, hard synthetic resin or like material. In symmetrical positions on opposite sides of the center line of the base 1, two turntables 2 and 2′ are pivotally mounted on the base 1 and may be used for mounting thereon, for example, a supply and rewinding reel and a take-up reel, respectively. Inwardly of these turntables 2 and 2′, there are two idlers 3 and 3′ which are in peripheral drive contact with the outer periphery of the respective turntables 2 and 2′. These idlers may have a structure such that a resilient rim of material such as rubber or soft synthetic resin is bonded under heat to the outer peripheral face of a disk of metal or like material. The idlers 3 and 3′ are freely rotatably mounted on the rear ends of mounting arms 4 and 4′ and have their front ends pivoted to the base 1 at 6 and 6′, respectively. Tension springs 7 and 7′ are anchored between the base 1 and the mounting arms 4 and 4′ in a manner to normally urge the idlers 3 and 3′ towards the turntables 2 and 2′, respectively. In order to assist the swinging movement of the idlers 3 and 3′ towards the associated turntables, the lower ends of the pivots 5 and 5′ are supported by grommets 9 and 9′ which are slidably received in slots 8 and 8′ of the base 1, respectively, so that the pivots 5 and 5′ are laterally slidable but not vertically movable.

An opening 10 of, for example, rectangular shape is provided substantially centrally of the base 1, and a cylindrical electric motor 11 is disposed in the opening 10 in such a manner that its rotary shaft sections 12 and 12′ extending in opposite directions from the motor terminate at positions beneath the outer peripheral portions of the respective idlers 3 and 3′. A metal strip or band 13 having substantially radially outwardly extending lugs 14 and 14′ is wound about the substantially central portion of the outer peripheral face of the electric motor 11, and these lugs 14 and 14′ are loosely received in holes 16 and 16′ of respective L-shaped flaps 15 and 15′ cut from the base 1 and bent at right angles with respect to the face of the base 1. Owing to the above arrangement, the electric motor 11 with its oppositely extending rotary shaft sections 12 and 12′ is tiltable in either direction about the lugs 14 and 14′ so that either shaft section can be placed into driving engagement with the lower face of the associated idler.

In order to cause the above tilting movement of the motor 11 a T-shaped member 17 of, for example, metal material is firmly fixed to the band 13 at a position immediately above the lug 14. Actuating levers 19 and 19′ having bent or off-set rear end portions 18 and 18′ engageable with the lower faces of opposite end portions of the T-shaped member 17 are forwardly and rearwardly slidable on the base 1 independently of each other by means of slots 20 and 20′ formed in these levers and pins 21 and 21′ extending from the base 1 and received in the slots 20 and 20′, respectively. The front ends of these actuating levers 19 and 19′ are operatively connected to respective actuating push buttons 23 and 23′ of a push button type of switching means 22 fixedly mounted at the front portion of the base 1. An unlocking push button 24 is disposed between these push buttons 23 and 23′. The internal structure including the locking mechanism of the switching means 22 is not illustrated herein because it is well known in the art.

Figure 2:
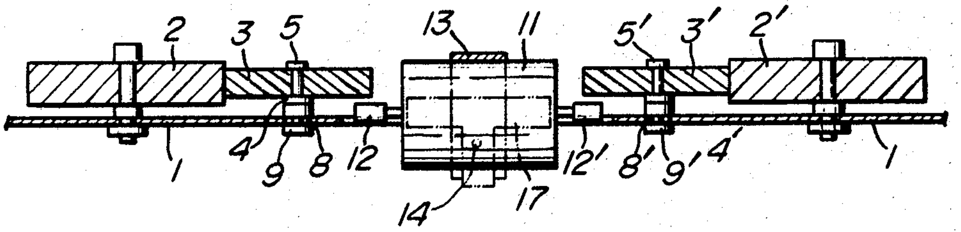
FIG. 2 is a sectional view taken on the line A—A in FIG. 1.
Figure 3:
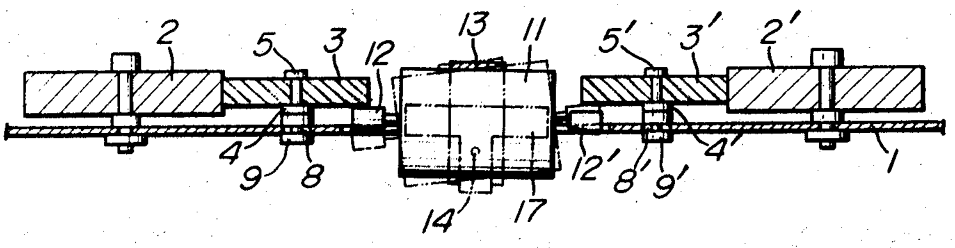
FIG. 3 is a view similar to FIG. 2 but showing an electric motor in its tilted state.
Figure 4:
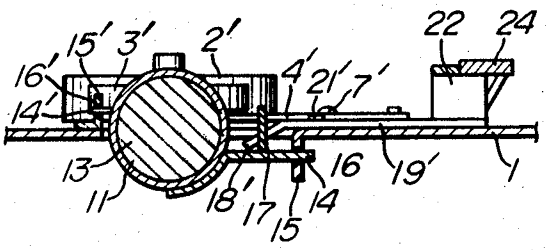
FIG. 4 is a sectional view taken on the line B—B in FIG. 1.

The inventive device with the structure as described above operates in the following manner. Under the state of the device as shown in FIGS. 1 and 2, the turntables 2 and 2′ are not being driven in any direction. Suppose, for example, a case in which the take-up turntable 2 is rotated so that a recording medium such as a magnetic tape or film (not shown) mounted on a take-up reel (not shown) on the take-up turntable 2′ is uncoiled for being rewound on a supply and rewinding reel (not shown) on the turntable 2. In this case, depression of the push button 23 on the switching means 22 will cause the advancing movement of the actuating lever 19 operatively connected thereto with the result that the bent rear end portion 18 urges upwardly the left-hand end of the T-shaped member 17 for thereby tilting the electric motor 11 in one direction as shown in FIG. 3, and the T-shaped member 17 is located in its tilted position. By this tilting movement of the electric motor 11, the left-hand rotary shaft section 12 is urged into pressure contact with the lower face adjacent to the outer peripheral portion of the idler 3. As a result, the idler 3 is rotated, for example, in the direction shown by the solid arrow in FIG. 1 and the turntable 2 in pressure contact with the idler 3 is rotated in the direction shown by the solid arrow to uncoil the recording medium such as a magnetic tape from the take-up reel for rewinding it on the supply and rewinding reel.

Upon completion of the rewinding operation, the unlocking push button 24 on the switching means 22 may be depressed. By the depression of the push button 24, the actuating lever 19 is released from its locked position so that the entire device returns to its original position as shown in FIGS. 1 and 2, and at the same time, brake elements (not shown) impart a brake action to the turntables 2 and 2' to stop the same.

In taking up a recording medium such as a magnetic tape on the take-up reel from the supply and rewinding reel, the push button 23' on the switching means 22 may be depressed. Depression of the push button 23' causes advancing movement of the actuating lever 19' so that its bent rear end portion 18' urges upwardly the right-hand end of the T-shaped member 17 to thereby tilt the electric motor 11 in the other direction as shown by chain lines in FIG. 3. By this tilting movement of the motor 11, the right-hand rotary shaft section 12' is urged into pressure contact with the lower face adjacent to the outer peripheral portion of the idler 3'. As a result, the idler 3' is rotated in the direction shown by the dotted arrow in FIG. 1 and the turntable 2' in pressure contact with the idler 3' is rotated in the direction shown by the dotted arrow to take up the recording medium such as a magnetic tape on the take-up reel from the supply and rewinding reel. At the completion of the take-up operation, the unlocking push button 24 on the switching means 22 may likewise be depressed. By the depression of the push button 24, the actuating lever 19' is released from its locked position so that the entire device returns to its original position as shown in FIGS. 1 and 2, and at the same time, the brake elements impart a brake action to the turntables 2 and 2' to stop the same.

It will be appreciated that, by virtue of the unique arrangement employed in the invention in which the idlers 3 and 3' are provided to transmit the rotation of the respective rotary shaft sections 12 and 12' of the electric motor 11 to the respective turntables 2 and 2', the spacing between the turntables 2 and 2' can be made greater than the turntable spacing in this kind of recording medium drive devices heretofore commonly used. The present invention with the above feature is advantageous in that considerably large-sized reels can be mounted on the turntables 2 and 2' and long-time recording or playback can thereby be effected. Other advantages derivable from the invention are that the device has a relatively small-sized compact overall structure and can be easily manufactured at low cost since mere addition of two idlers to the prior structure is almost all that is required. The device according to the invention is thus quite suitable for use in rotary apparatus such as magnetic recorders, cameras, picture projectors and the like.

In lieu of the switching means 22 having the unlocking push button 24 referred to in the above embodiment of the invention, a double-depression type switching means may be used which operates in a manner that it is locked by the first depression of the push button and is released from its locked position by the second depression of the same push button. Alternatively, in lieu of the push button type of switching means 22, a lever-operated type of locking-unlocking switching means may be employed and will work in a manner similar to that described in the above embodiment.

What is claimed is:

1. A device for fast forwarding and rewinding of a recording medium comprising
   - a planar base;
   - first and second turntables for carrying a recording medium;
   - first means for rotatably mounting said first and second turntables in spaced relationship on said base;
   - first and second idlers;
   - second means disposing said first idler in constant peripheral contact with said first turntable, said first idler and said first turntable being disposed in substantially the same plane;
   - third means disposing said second idler in constant peripheral contact with said second turntable, said second idler and said second turntable being disposed in substantially the same plane;
   - an electric motor having rotary shaft means;
   - fourth means tiltably mounting said electric motor on said base between said first and second idlers so that when said electric motor is tilted in a first direction said rotary shaft means is in contact with said first idler and when said electric motor is tilted in a second direction said rotary shaft means is in contact with said second idler; and
   - fifth means operatively connected with said electric motor to selectively tilt said electric motor whereby said first and second turntables may be selectively rotated.

2. The invention as recited in claim 1 wherein said fifth means includes a T-shaped member attached to said electric motor and means for locking said T-shaped member in a tilted position whereby a selected one of said first and second turntables is rotated.

3. The invention as recited in claim 2 wherein said fifth means further includes push button means for moving said T-shaped member.

4. The invention as recited in claim 2 wherein said fifth means further includes lever means for moving said T-shaped member.

5. The invention as recited in claim 2 wherein said fifth means further includes first and second slidable members having off-set end portions, and means for disposing said first and second slidable members so that said off-set end portions are slidably engageable with said T-shaped member whereby said electric motor is tiltable in response to selective movement of said first and second slidable members.

References Cited

UNITED STATES PATENTS

| | | | |
|---|---|---|---|
| 773,985 | 11/1904 | Ries | 179—100.2 |
| 3,016,244 | 1/1962 | Schuh et al. | 274—4 |
| 2,973,156 | 2/1961 | Draheim | 242—55.12 |
| 3,130,934 | 4/1964 | Richt et al. | 242—55.12 |
| 3,137,454 | 6/1964 | Atsumi | 242—55.12 |

LEONARD D. CHRISTIAN, Primary Examiner